United States Patent [19]
Cheng

[11] Patent Number: 4,556,824
[45] Date of Patent: Dec. 3, 1985

[54] LIGHT-ADJUSTMENT AND SWITCH STRUCTURE FOR ARTISTIC TABLE LAMPS

[76] Inventor: Hsiang T. Cheng, 2F, No. 185, Nan Ya W Rd., Sec. 2, Pan Chiao City, Taipei Hsien, Taiwan

[21] Appl. No.: 579,935

[22] Filed: Feb. 14, 1984

[51] Int. Cl.⁴ ............................................. H05B 37/02
[52] U.S. Cl. .............................. 315/362; 315/209 R; 315/363
[58] Field of Search ................. 200/DIG. 1; 307/157, 307/116, 308; 315/DIG. 4, 209 R, 362; 340/562

[56] References Cited

U.S. PATENT DOCUMENTS 3,147,928  9/1964  Carpenter ............................ 307/157
4,125,794  11/1978  Pohl ..................................... 315/362
4,211,959  7/1980  Deavenport et al. ................ 315/362

Primary Examiner—Harold Dixon
Attorney, Agent, or Firm—Armstrong, Nikaido, Marmelstein & Kubovcik

[57] ABSTRACT

A light adjustment and switch structure for artistic table lamps, applicable to a touch induction surface of the artistic table lamp socket, as the entire external surface of this socket is set as a touch induction surface made of a material having a good external appearance but with a low induction coefficient such as of ceramics, pottery, marble, glass, wood, plastics, acrylics, etc. . . . in order to make the design of the external appearance of the artistic table lamps not involve any serious considerations over factors such as the position and size of this switch.

3 Claims, 9 Drawing Figures

LIGHT-ADJUSTMENT AND SWITCH STRUCTURE FOR ARTISTIC TABLE LAMPS

BACKGROUND OF THE INVENTION

As the level of human life has been gradually upgraded along with scientific developments, the basic requirements on common daily-use articles are to match the habits and customs and nature of the human life and to comply with the principles of human mechanics so as to be extremly convenient to use and ready for service. With regard to "table lamps", since a long time ago, the actions of adjusting the brightness of lights and of turning the switches off and on have been all dependent upon operating a switch installed on the external surface of the table lamp. While operating the switch, the user's hand must move to the specific positions of the switch and conduct actions such as press, pull and turn. The present invention introduces a touch-type switch to the latest table lamps. The static charge on a human body is used and the surface of a conductor like a copper plate or copper pipe surface is set as the touch surface, so that during operation, the user's hand is no longer required to conduct press, pull or turn actions, but still has to move to specific positions to touch the touch surface of the copper plate or copper plate. This is more convenient during use, but still has a defect: it is not easy to immediately touch the switch in the dark. Besides, if the user's position is a stance just opposite to that of the switch or by his posture it is not easy to directly touch the switch, he may still feel an inconvenience, since he has to stretch his hand to a specific position to operate the switch. Additionally, as the requirements on the sense of quality over the external appearance of the artistic table lamps are very high, if any metal material like a copper plate is placed on the outer surface of a table lamp, this will not easily satisfy the consumer's visual aesthetic requirements. Hence, the object of the present invention is to provide a kind of artistic table lamp more suitable for the habits and customs and nature of human life in order to upgrade the level of our life.

SUMMARY OF THE INVENTION

The main object of this invention is to provide a light-adjustment and switch structure for artistic table lamps so as to set the entire external surface of a table lamp stand as a touch induction type light adjustment switch to expedite the users' operations. Another object of this invention is to provide a light adjustment switch structure for artistic lamps to make the touch induction surface (suitably made of a material such as ceramics, pottery, marble, glass, wood, plastics, acrylic . . . ) fully comply with the users' requirements on the quality feeling over the external appearance of the artistic table lamps. Other objects and features of this invention may be further understood, after reading the following descriptions with reference to the accompanying drawings.

DETAILED DESCRIPTION OF THE INVENTION

The defects and difficulties confronted in designs concerning the conductors such as copper plate or copper pipe conventionally used as a touch induction area are described as follows:

1. If we try to set the entire integral external surface of an integral table lamp stand as a copper or metal conductor to serve as an overall touch induction area, it is very hard to do so in fact. Because a conductor like copper plate, etc. has an induction field itself, and if a conductor is made in a required external configuration at will, the magnetic fields induced by the various parts of it are in an uneven distribution and interfere with one another. Especially, after the use of a table lamp, its temperature goes up, making the induced magnetic field of the conductor expand, which, in turn, causes difficulties in setting the trigger-off points or even leads to wrong trigger-off situations.

2. If a metal conductor is set as the external surface of an artistic table lamp, its quality feeling does not meet the users' requirements.

Figure 3:
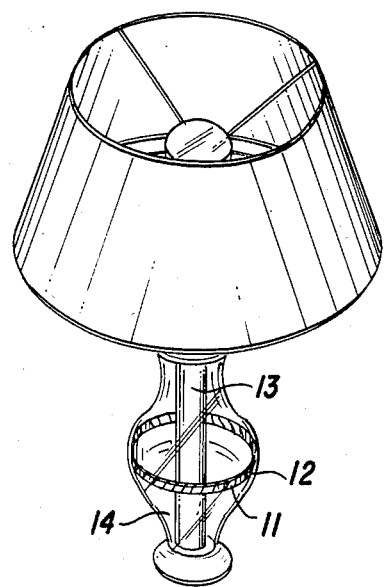
FIGS. 1-4 show examples of the external configuration of artistic table lamps, wherein the manner of disposition of the induction plate in conjunction with the present invention are disclosed.
Figure 4:
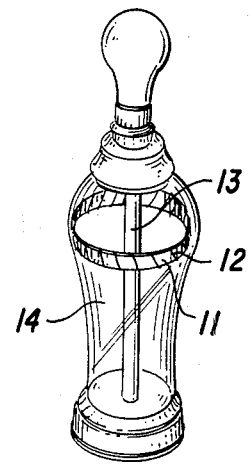
Figure 1:
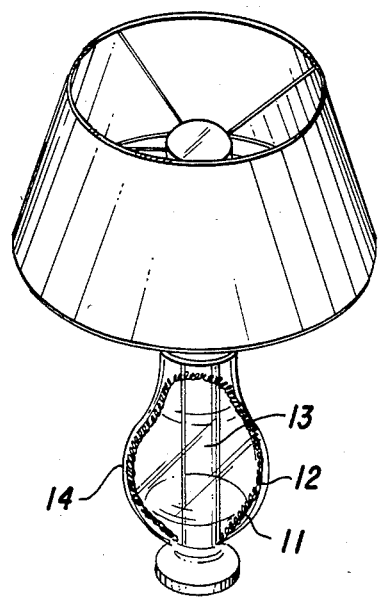
Figure 2:
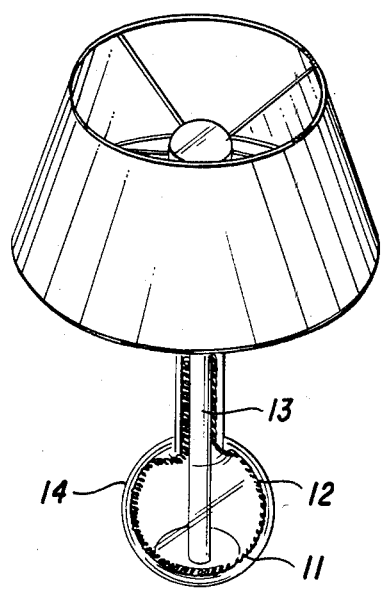
Figure 5:
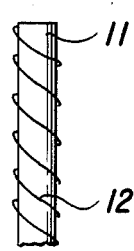
FIG. 5 is a view of the signal trigger-off circuit and the electro-magnetic induction plate structure in conjunction with the present invention.
Figure 5:
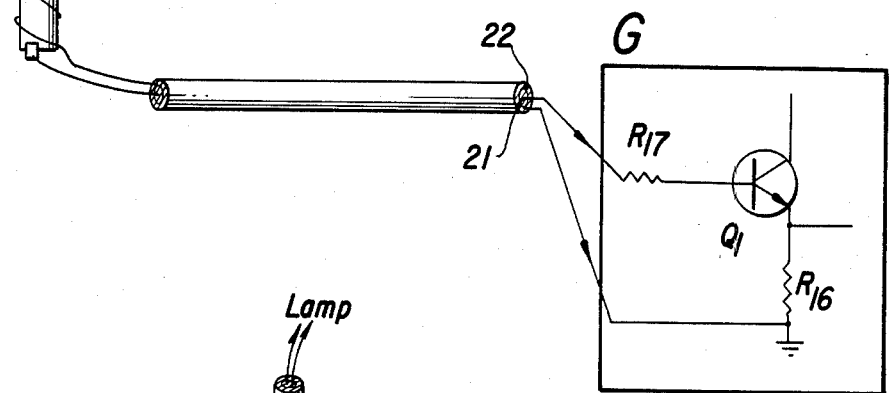

In this invention, materials like ceramics, pottery, marble, glass, wood, plastics, acrylic . . . are recommended to be used for making the required touch induction surface. However, because the induction coefficients of these materials are extremely small, the inventor therefore considers to have for such an induction plate a long-strip copper plate . . . to be combined with any one of the above-cited materials to produce an inductive magnetic field, so whenever the user's hand touches the outer surface of the above-described touch surface made of ceramics . . . , the static charges of the human body generate a signal to this inductive magnetic field, and this invention introduces such a signal entering the operational circuit, thus working as a light adjustment or turn-off or on signal. Besides, to avoid the mutual interference of the electro-magnetic fields of different portions of this induction plate, this invention suggests winding a demagnetizing wire around the surface of this induction plate, thus making the combined induction plate installed inside to freely conform with the external configuration. Please refer to the attached drawings. Metal induction plate (11) of this invention is placed very close to the inner surface of the outer casing of the table lamp stand, and demagnetizing wire (12) is wound around the outside of induction plate (11). When the user's hand touches the external surface made of ceramics, etc. . . . , the static charges on the user's body produce a change in the electro-magnetic field of induction plate (11) to trigger on the base B in transistor Q1 of the operational circuit, thus making transistor Q1 operate. To avoid interference, the line connecting transistor base B in transistor Q1 and induction plate (11) should be core line (21) and this core line (21) must be externally wound with demagnetizing wire (22) as shown in FIG. 5, and this demagnetizing conductor wire is connected to the grounding line in the operational circuit.

Figure 6:
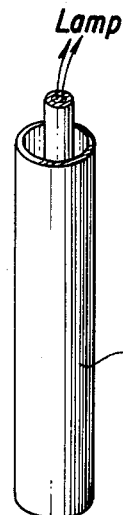
FIG. 6 is a view of the connection method of the operational circuit output and the table lamp LAMP in conjunction with the present invention.
Figure 6:
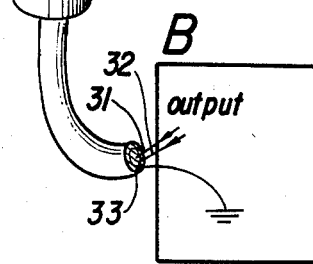

The base plate of the operational circuit of this invention is generally placed on the bottom seat of the table lamp and is insulated by an insulator from the ground floor, the output line in the operational circuit is connected to the LAMP (bulb) of the table lamp via a metal tube (13). However, because the LAMP (bulb) gets 110 V or 220 V, the current is very high, and when any electric current flows through a metal, an induced magnetic field is thus produced, which, in turn, will affect the induction of induction plate (11). Hence, please refer to FIG. 6. LAMP is connected to the output line of the circuit by two core lines (31) and (32), a demagnetizing wire (33) is wound around core lines (31) and (32), and the demagnetizing conductor (33) is connected to the grounding line of the operational circuit.

Please refer to FIGS. 1—4. In this invention, the induced electromagnetic fields of induction plate (11) and the current flow lines would not mutually interfere with one another due to the demagnetizing design of the induction plate and these lines themselves, especially the electro-magnetic fields produced by various parts of induction plate (11) itself would not interfere with other parts, so induction plate (11) can be closely installed on the inner wall of the table lamp stand to conform with various external configurations of the table lamp stand, after the critical induction value is properly set and the overall external surface (14) made of a material such as ceramics, pottery, marble, glass, wood, plastics, acrylics . . . is touched by the user's hand, this will touch on the operational circuit of the light adjustment and turning on-or-off switch to actuation.

Figure 7:
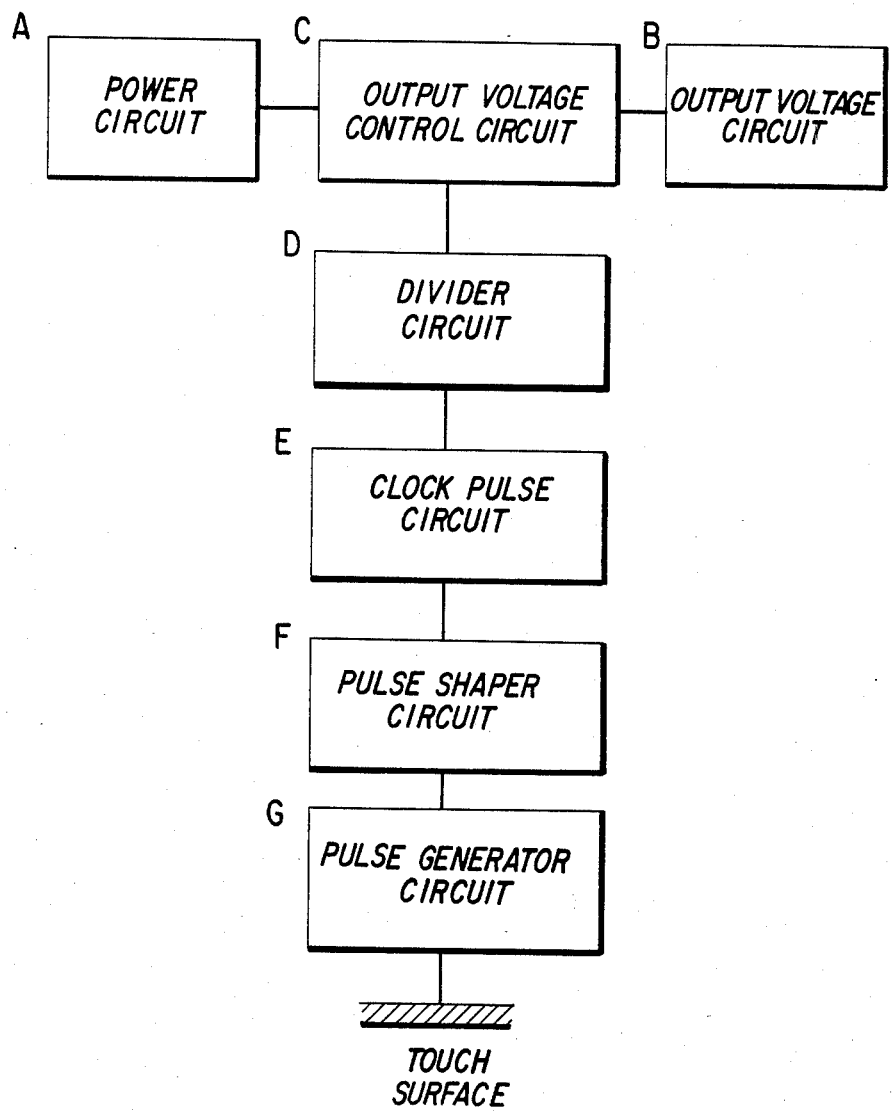
FIG. 7 is a block diagram of a first example of the operational circuit in conjunction with the present invention.
Figure 8:
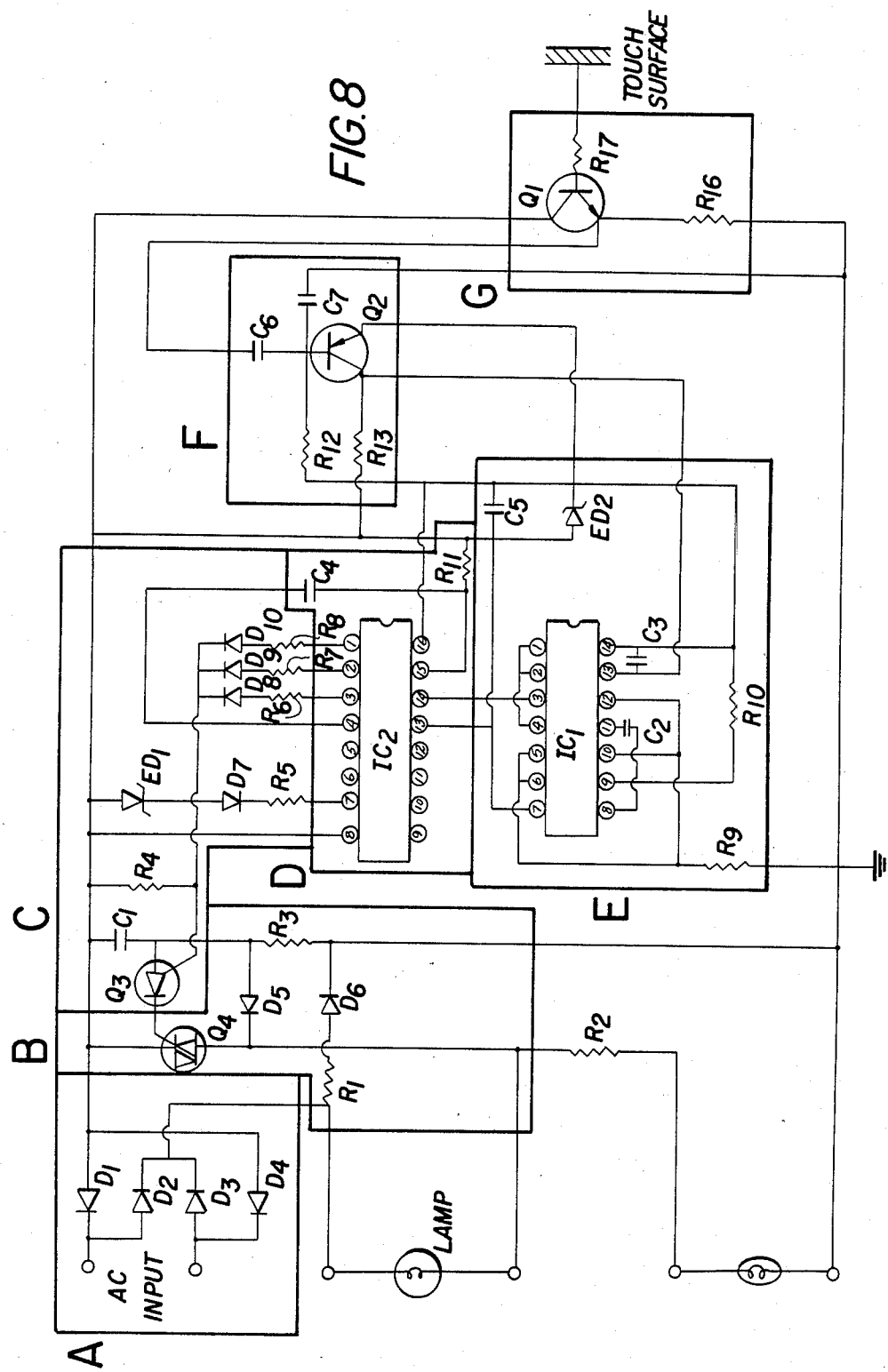
FIG. 8 is the circuit diagram of the first example of the operational circuit in conjunction with the present invention.

The following two examples of the operational circuit are presented to further describe the present invention. Please refer to FIGS. 7 and 8. A first examplary operational circuit of this invention includes the main parts: namely power circuit A, output voltage control circuit C, output voltage circuit B, divider circuit D, clock pulse circuit E, pulse shaper circuit F and pulse generator circuit G. When and after base B in transistor Q1 in pulse generator circuit G is triggered on, the collector C and emitter E junction conducts a current and thus produces a pulse, but this pulse is unstable and is then stabilized by transistor Q2 in pulse shaper circuit F to eliminate any interference waves and to make the pulse stable, the pulse is output via collector C of transistor Q2, an input at terminal 13 of IC (a 4001 IC may be used for IC1) of clock pulse circuit E, and then delayed and converted to produce a clock pulse which is output at terminal 3 of IC1. Whenever IC 1 outputs a clock pulse, IC2 (a 4002 may be used for IC2) of divider circuit D outputs, at terminals 2, 1, 3, 7 and 4 in sequence, a voltage which is further divided via five different resistant lines respectively (This embodiment sets such divider voltages as step 1, step 2, step 3, step 4 and OFF), and then the gate terminal of semi-conductor Q3 of the output voltage control circuit C accepts such different voltages to cause its anode A and cathode K conduct an electric current, due to different resistances, the output voltages of cathode K are also different, then the cathode K of Q3 changes and controls the gate of Q4 of a three-terminal silicon control converter TRIAC in the output voltage circuit B to respectively turn Q4 on to conduct different output voltages, thus making the load of the LAMP (bulb) act as a very dim light, dim light, light, most bright light or turn OFF in sequence.

Figure 9:
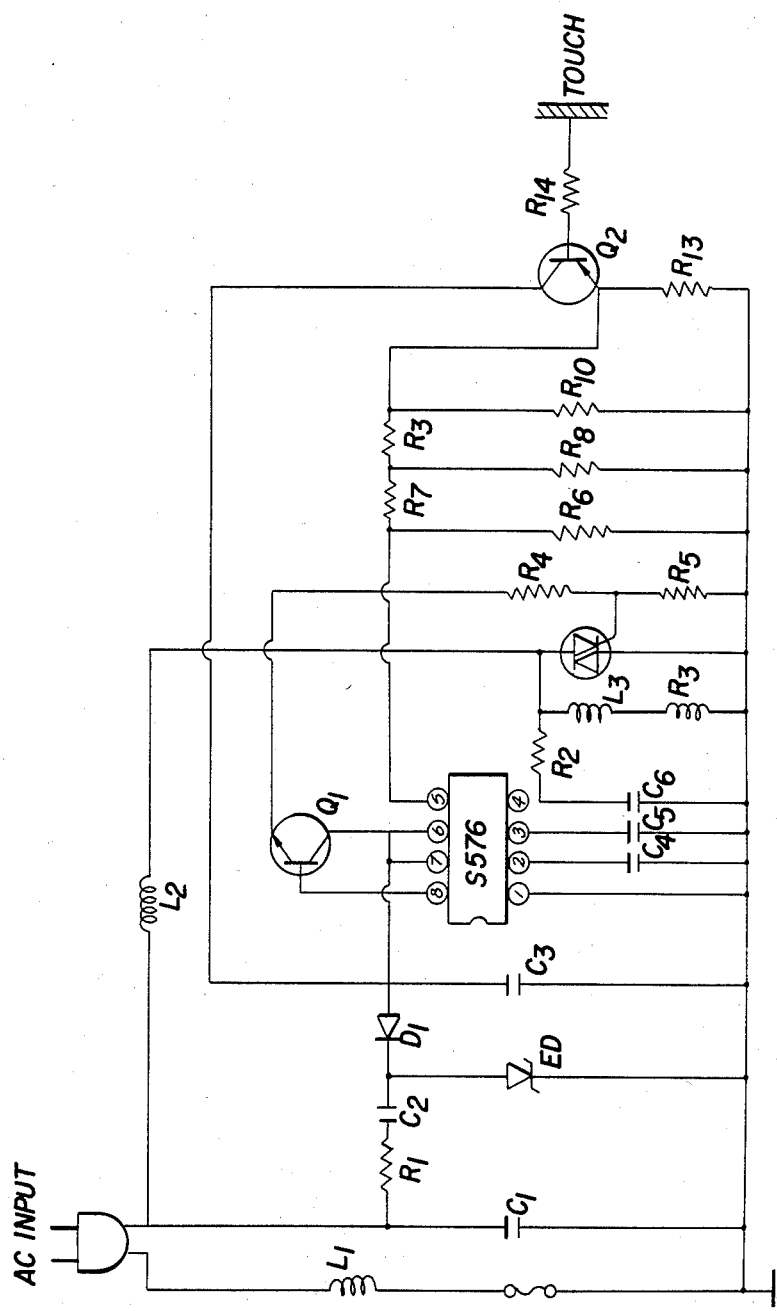
FIG. 9 is a circuit diagram of a second example of the operational circuit in conjunction with the present invention.

Please refer to FIG. 9. This invention is also applicable to a stepless switch circuit. For instance, we may use an integrated circuit S576 plus a discrete circuit. This would achieve the same purpose. Since use of such a circuit does not affect the scope of the present invention, no more elaboration about it is needed.

Finally, samples have been made according to this invention, and field tested. The inventor has found that under the sensitive degree that the user's hand can touch and trigger it on, any light touch by any small pets such as cats, dogs (except touches by their entire body) on these samples would not easily and unexpectedly cause trigger-on events. Besides, this invention as presented here is also applicable at the same time to the metal-made table lamp stands.

In summary, this invention can improve the functions of the artistic table lamps to provide artistic table lamps with their outer appearance made of such a material with an excellent quality feeling as ceramics, pottery, marble, glass, wood, plastics, acrylics . . . , and a touch on any position of the external surface of the table lamp stand by the user's hand from any direction will certainly achieve the purpose of controlling the light intensity and turning the light off or on. This is greatly helpful to upgrading the level of human life and undoubtedly has a high practical value.

We claim:

1. A light adjustment and switch structure for Artistic Table Lamps, comprising a metal induction plate, demagnetizing wires and an operational circuit; wherein the induction plate without any specific limits imposed on its length and width, is made in a proper shape and placed on the inner wall of the external casing of the table lamp stand in a position very close to the table lamp stand, and a demagnetizing wire is wound externally around the induction plate, of which the connection line between the induction plate and the input end of the operational circuit is a core line (cable), and a demagnetizing wire is wrapped externally around this core line (cable) and is connected to the grounding end of the operational circuit, wherein the voltage output line of the operational circuit is connected to the LAMP (bulb) of a table lamp by two core lines, a demagnetizing wire is wrapped around these core lines (cable) and is connected to the grounding line of the operational circuit; whereby the entire external surface of the table lamp stand is provided as a tough induction surface, and this touch induction surface is suitably made of a material low in induction coefficient such as ceramics, pottery, marble, glass, wood, plastics, acrylics . . . etc.

2. An artistic table lamp comprising as the main parts thereof a metal tube, an operational circuit, an insulator, a table lamp stand, bulb socket, bulb and the light adjustment and switch structure as recited in claim 1, wherein the operational circuit is insulated from the ground by an insulator, while the metal tube is placed inside the table lamp for connecting the operational circuit and the bulb socket and bulb.

3. The operational circuit as recited in claim 1, wherein it comprises a power circuit, output voltage control circuit, output voltage circuit, divider circuit, clock pulse circuit, pulse shaper circuit and pulse generator circuit; and wherein after a base B in a transistor Q1 of the pulse generator circuit is triggered on, the collector C and emitter E thereof conduct a current and thus generate a pulse which is stabilized by a transistor Q2 in the pulse shaper circuit to eliminate therefrom any interference waves and is then output by a collector C in Q2, and is thus input to an IC1 in the clock pulse circuit, and is delayed and converted to produce a clock pulse; and whenever a clock pulse is output by IC1, an IC2 in the divider circuit also outputs a voltage in sequence, which is further divided via several different resistant lines, then when a gate pole of a semiconductor Q3 of the output voltage control circuit accepts said different voltages, a pole K in Q3 changes and controls a gate pole in a Q4 of a three-pole silicon control converter TRIAC in the output voltage circuit to respectively turn Q4 ON in order to produce different output voltages, thus making the load of the bulb (LAMP) act as a very dim light, dim light, light, most bright light, or turn OFF in sequence.

* * * * *